US012781761B2

(12) United States Patent
Meier et al.

(10) Patent No.: US 12,781,761 B2
(45) Date of Patent: Nov. 3, 2026

(54) TURBOMACHINE

(71) Applicant: Micronel AG, Tagelswangen (CH)

(72) Inventors: Peter Meier, Freienbach (CH); Ernst Scherrer, Winterthur (CH)

(73) Assignee: Micronel AG, Tagelswangen (CH)

( * ) Notice: Subject to any disclaimer, the term of this patent is extended or adjusted under 35 U.S.C. 154(b) by 175 days.

(21) Appl. No.: 18/039,587

(22) PCT Filed: Nov. 4, 2021

(86) PCT No.: PCT/EP2021/080594
§ 371 (c)(1),
(2) Date: May 31, 2023

(87) PCT Pub. No.: WO2022/117273
PCT Pub. Date: Jun. 9, 2022

(65) Prior Publication Data

US 2024/0102486 A1 Mar. 28, 2024

(30) Foreign Application Priority Data

Dec. 1, 2020 (EP) .................................... 20210999

(51) Int. Cl.
*F04D 29/42* (2006.01)
*B33Y 80/00* (2015.01)
(Continued)

(52) U.S. Cl.
CPC .......... *F04D 29/4226* (2013.01); *B33Y 80/00* (2014.12); *F04D 29/023* (2013.01);
(Continued)

(58) Field of Classification Search
CPC .. F04D 29/4206; F04D 29/023; F04D 29/281; F04D 29/284; F04D 29/4226;
(Continued)

(56) References Cited

U.S. PATENT DOCUMENTS 8,303,274 B2 11/2012 Winkler
10,634,153 B1 4/2020 Pinera et al.
(Continued)

FOREIGN PATENT DOCUMENTS

CH 717838 A2 * 3/2022 ........ A61M 16/0066
CN 102686282 A 9/2012
(Continued)

OTHER PUBLICATIONS

CH717838A2 translation (Year: 2025).*
(Continued)

*Primary Examiner* — David N Brandt
(74) *Attorney, Agent, or Firm* — The Webb Law Firm

(57) ABSTRACT

A turbomachine has a housing with at least one flow channel, an impeller which is arranged in the housing, and a drive motor. The drive motor is used to drive the impeller in order to suction a fluid into the housing through the at least one flow channel and/or to convey the fluid out of the housing through the at least one flow channel. The housing is produced by an additive manufacturing process. Further disclosed is a turbomachine in which the impeller is produced in an injection molding method and is molded directly onto the rotor of a drive motor designed as an external rotor motor.

15 Claims, 8 Drawing Sheets

(51) Int. Cl.

| | |
|---|---|
| ***F04D 17/10*** | (2006.01) |
| ***F04D 25/06*** | (2006.01) |
| ***F04D 29/02*** | (2006.01) |
| ***F04D 29/28*** | (2006.01) |
| ***F04D 29/70*** | (2006.01) |

(52) U.S. Cl.
CPC ......... *F04D 29/281* (2013.01); *F04D 29/284* (2013.01); *F04D 29/701* (2013.01); *F04D 17/10* (2013.01); *F04D 25/064* (2013.01); *F05D 2230/30* (2013.01)

(58) Field of Classification Search
CPC ...... F04D 29/701; F04D 17/10; F04D 25/064; B33Y 80/00; F05D 2230/30
See application file for complete search history.

(56) References Cited

U.S. PATENT DOCUMENTS

| | | | | |
|---|---|---|---|---|
| 11,225,976 | B2 | 1/2022 | Weinzierl et al. | |
| 2005/0207887 | A1 | 9/2005 | Yoshida et al. | |
| 2005/0210622 | A1 | 9/2005 | Baecke et al. | |
| 2008/0226472 | A1 | 9/2008 | Kanai et al. | |
| 2012/0224955 | A1 * | 9/2012 | Vine | F04D 29/444 415/208.1 |
| 2018/0058467 | A1 * | 3/2018 | Lin | F04D 29/30 |
| 2020/0072232 | A1 | 3/2020 | Alstad et al. | |
| 2020/0331063 | A1 * | 10/2020 | Nass | F04D 1/06 |
| 2021/0001068 | A1 * | 1/2021 | Davoine | A61M 16/0066 |
| 2021/0008310 | A1 | 1/2021 | Wada et al. | |

FOREIGN PATENT DOCUMENTS

| | | | | | |
|---|---|---|---|---|---|
| CN | 105090118 | A | | 11/2015 | |
| CN | 107355392 | A | * | 11/2017 | F04D 29/281 |
| CN | 108799160 | A | | 11/2018 | |
| CN | 211901028 | U | | 11/2020 | |
| DE | 8331997 | U1 | | 7/1995 | |
| DE | 102017130767 | A1 | | 6/2019 | |
| DE | 102018200287 | A1 | | 7/2019 | |
| EP | 2020736 | A2 | | 2/2009 | |
| EP | 2072832 | A2 | | 6/2009 | |
| EP | 3379085 | A1 | | 9/2018 | |
| EP | 3421806 | A1 | | 1/2019 | |
| GB | 2575476 | A | * | 1/2020 | F04D 29/441 |
| JP | 2004232559 | A | | 8/2004 | |
| JP | 2005273593 | A | | 10/2005 | |
| JP | 2008297937 | A | | 12/2008 | |
| JP | 2015509427 | A | | 3/2015 | |
| JP | 2019514558 | A | | 6/2019 | |
| JP | 2020033950 | A | | 3/2020 | |
| WO | 2006045602 | A1 | | 5/2006 | |
| WO | 2011062633 | A1 | | 5/2011 | |
| WO | 2013133889 | A1 | | 9/2013 | |
| WO | 2017187392 | A1 | | 11/2017 | |
| WO | 2017191534 | A1 | | 11/2017 | |
| WO | 2019015946 | A2 | | 1/2019 | |
| WO | 2019055472 | A1 | | 3/2019 | |
| WO | 2019189127 | A1 | | 10/2019 | |
| WO | 2019201448 | A1 | | 10/2019 | |

OTHER PUBLICATIONS

CN107355392A translation (Year: 2025).*
pmwdynamics.com; Advantages of External Rotor Motors—PMW; from pmwdynamics.com/news/advantages-of-external-rotor-motors/ (Year: 2025).*

* cited by examiner

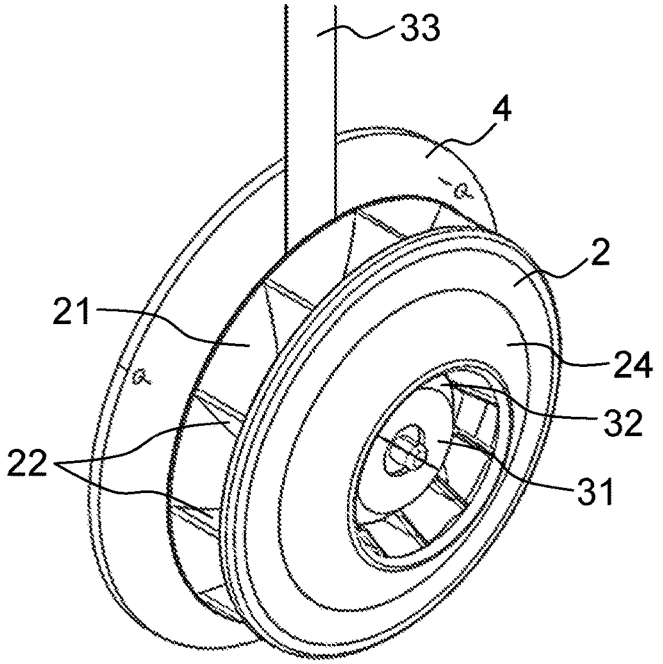
FIG. 20
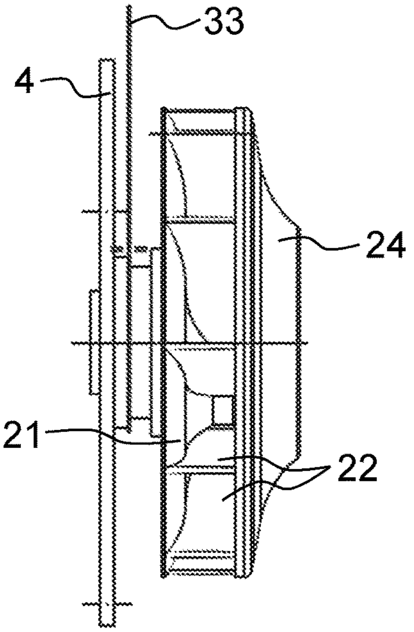
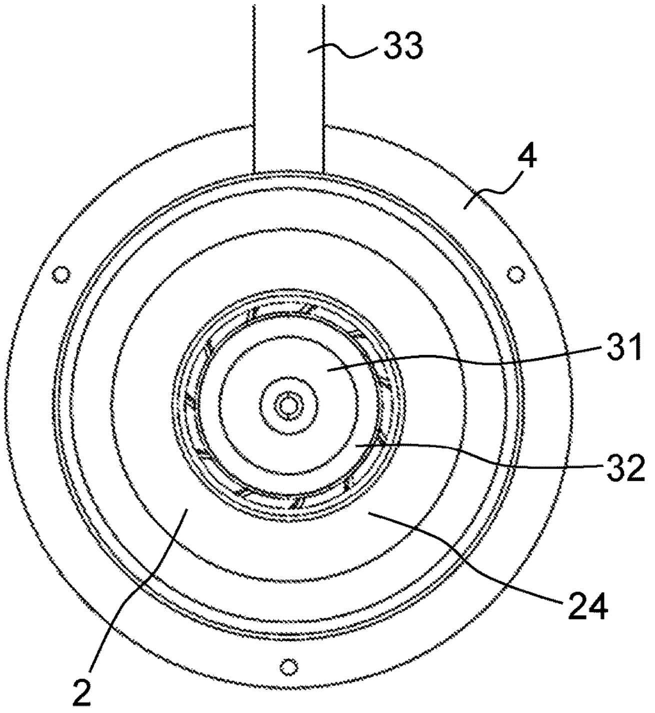
FIG. 21
FIG. 22

TURBOMACHINE

CROSS-REFERENCE TO RELATED APPLICATIONS

This application is the United States national phase of International Application No. PCT/EP2021/080594 filed Nov. 4, 2021, and claims priority to European Patent Application No. 20210999.7 filed Dec. 1, 2020, the disclosures of which are hereby incorporated by reference in their entireties.

BACKGROUND OF THE INVENTION

Field of the Invention

The present invention relates to a turbomachine for sucking in and conveying a fluid such as, in particular, a gas. The turbomachine can serve, for example, to generate a fluid flow, to extract fluid and/or to generate a positive or negative pressure.

Description of Related Art

Turbomachines have been known for a long time and are used in a very wide variety of applications. The relevant turbomachines within the context of this property right comprise a usually electrically driven runner which rotates in a housing. As a result, a fluid is sucked in, compressed and conveyed. Depending on the type of turbomachine, the fluid can be, for example, a gas such as, in particular, air, or a liquid. If the fluid is a gas, the turbomachine is usually called a ventilator or a compressor. While ventilators achieve a pressure ratio between 1 and 1.3 between the intake side and the pressure side, the turbomachines which are called compressors achieve a pressure ratio of greater than 1.3. In common parlance, ventilators and compressors are often called fans or blowers.

Turbomachines in the form of ventilators and compressors are used, in particular, for ventilating patients such as, for example, in CPAP (Continuous Positive Airway Pressure) ventilation. In CPAP ventilation which is used, for example, in intensive care and emergency medicine, but also as a therapy in sleep apnea, the breathing of the patient is assisted with a constant positive air pressure.

A turbomachine for use in a CPAP unit is disclosed, for example, in WO 2006/045602 A1. The simply exchangeable turbomachine comprises an impeller for generating the positive pressure, which impeller is coupled to an electric motor and is received in a multiple-part housing.

DE 83 31 997.2 U1 discloses a small DC ventilator with an external rotor motor, on the outer shell of which a runner is adhesively bonded or shrink-fitted.

EP 2 072 832 A2 discloses a miniature fan for cooling technical components such as, for example, printed circuit boards. The fan has a motor with an external rotor, to which a fan impeller is fastened.

In the case of the apparatus from EP 2 020 736 A2, a fan impeller is fastened by means of screws to the external rotor of a brushless motor.

US 2008/0226472 A1 discloses a fan, in the case of which the fan impeller is accommodated together with the drive motor in a cassette-shaped, multiple-part housing. Flow channels which serve to suck in and expel the air conveyed by the fan impeller are configured in the interior of the housing.

CN 105090118 A1 discloses a water pump with a cassette-like housing, in the interior of which an impeller for conveying the water is arranged. The housing comprises flow channels for feeding in and discharging the water. The housing can be combined with different impellers by one channel part being of movable configuration.

SUMMARY OF THE INVENTION

It is therefore an object of the present invention to specify an efficient turbomachine which can be produced simply and inexpensively.

In order to achieve this object, the present invention provides a turbomachine, in particular a ventilator or compressor, comprising

- a housing with at least one flow channel;
- a runner which is arranged in the housing; and
- a drive motor for driving the runner in a rotational movement about a rotational axis, in order to suck a fluid, in particular a gas, into the housing through the at least one flow channel and/or to convey the fluid out of the housing through the at least one flow channel.

According to the invention, the housing is produced by means of additive manufacturing.

The additive manufacturing not only makes it possible for the housing to be produced in a simple way, but rather also permits the configuration of complex three-dimensional structures on the housing. For instance, the one or the plurality of flow channels can have rounded surfaces and/or curves without problems, and can also run completely in the housing interior, that is to say can have portions which are enclosed completely by the material of the housing in cross section. On account of the production by means of additive manufacturing, the housing can also have undercuts and/or cavities, which, in the case of conventional production methods, would not be possible in one piece or would be possible only with considerable additional effort. Furthermore, the additive manufacturing not only makes the parallel production of a multiplicity of housings at the same time possible, but rather also allows a highly flexible adaptation of the housing form to specific requirements and/or to customer requests. On account of the additive manufacturing, the production of structures which are of particularly small dimensions but are nevertheless three-dimensionally complicated is possible, with the result that the production of particularly small but nevertheless highly efficient turbomachines is possible.

The additive manufacturing (also called 3D printing) denotes manufacturing processes, in the case of which material is applied layer by layer and advantageously in a computer-controlled manner. For example, plastics, synthetic resins, ceramics and metals are possible as materials, it being possible for the materials to be applied in liquid or solid form (for example, as a powder) during manufacturing. During manufacturing, physical and/or chemical curing or melting processes advantageously take place during the application or immediately afterward.

On account of the additive manufacturing, the production can be adapted very simply to different housing shapes. In particular, no specific tools such as, for example, casting molds have to be made to this end. An adaptation is therefore worthwhile even for small quantities, with the result that the turbomachine can be re-dimensioned in a simple way, for example, with regard to its power output, or can be adapted to specific requirements and/or to customer requests.

By it being possible for the housing to have a complex three-dimensional structure with, for example, undercuts, cavities and flow channels which run completely in the interior with bends, curves, etc., particularly satisfactory optimization of the turbomachine with regard to hydrodynamic or aerodynamic requirements and/or with regard to acoustic specifications is possible. The chamber, in which the runner is arranged, can also be adapted in an optimum manner with regard to the shape of its inner surfaces to hydrodynamic or aerodynamic requirements. The possibility of cavities can be utilized, for example, to reduce the material consumption or the weight of the turbomachine during production. For example, however, cavities can also be provided in a targeted manner to positively influence the acoustic behavior of the housing or the turbomachine. The abovementioned cavity or cavities can be arranged completely in the housing interior here, that is to say can be enclosed completely by the material of the housing. In accordance with a development of the invention, the cavity or cavities can be filled partially or completely with a powder. It has been shown that the powder in the cavities leads to a considerable reduction of vibrations and noise emissions. The powder can be, in particular, the additive powder which is used for additive manufacturing of the housing, but which is not cured or melted in the region of the cavities, but rather remains in powder form in the cavities. The production of a turbomachine with low noise emissions becomes particularly simple as a result.

The turbomachine is preferably a ventilator or compressor for conveying a gas such as, in particular, air. This can be, in particular, a radial turbomachine, in the case of which the fluid is sucked in axially or parallel to the rotational axis in the immediate region of the runner. In the case of the radial turbomachine, the fluid flow is deflected by 90° by way of the rotation of the runner and is conveyed out of the runner in the radial direction, in order then to be ejected toward the outside through gas outlet. In other words, the runner can be configured, in particular, to deflect the fluid flow from an axial direction into a radial direction with regard to the rotational axis. In the case of a predefined air quantity, radial turbomachines usually make the generation of a comparatively great pressure possible. In addition, the flow channel or at least one of the flow channels can be, in particular, an inflow channel which, at least in the portion directly upstream of the runner, extends toward the runner in such a way that the fluid which is sucked in through the inflow channel impinges on the runner in the axial direction with regard to the rotational axis and centrally. It would also fundamentally be possible, however, that the turbomachine is an axial turbomachine, in the case of which the fluid flow flows into the housing in the axial direction with regard to the rotational axis and flows toward the runner and in the axial direction away from the runner and out of the housing.

In comparison with conventional production types, components which are produced by means of additive manufacturing usually have a somewhat increased surface roughness. It has been surprisingly found that this can entail certain advantages as the case may be in the housing of the turbomachine according to the invention: On account of the increased surface roughness of the housing inner surfaces such as, for example, in the region of the runner chamber and the flow channels, small turbulences arise at the edge of the fluid flow. Within these turbulences, however, the fluid can continue to flow in a largely laminar manner. In particular at points which are acoustically sensitive such as, for example, in the region of the inlet and outlet orifices, the turbulences lead, however, to a considerable reduction of vibrations on the housing. The increased surface roughness can therefore unexpectedly lead overall to a reduction in the noise emissions during operation of the turbomachine. Moreover, the increased surface roughness leads to the noise being reflected in the interior of the housing diffusely, that is to say in different directions, to an increased extent, and therefore being absorbed more readily on account of the greater surface area.

On account of the additive manufacturing, the housing therefore usually has a somewhat increased surface roughness in comparison with conventional production types. In addition, when looked at more closely, at any rate when enlarged or even under a microscope, the layers which are applied during the manufacturing are usually still visible even on the finally produced housing. Furthermore, a person skilled in the art can often also detect the production by means of additive manufacturing on the basis of the complexity of the three-dimensional shape of the housing. The additive manufacturing of the housing is therefore readily identifiable on the finished turbomachine for a person skilled in the art.

The flow channel or flow channels advantageously runs/run to a large extent in the interior of the housing. The runner chamber is also preferably situated to a large extent in the interior of the housing, that is to say 50% or more, preferably 60% or more, more preferably 70% or more of its inner surfaces are formed by the housing. The flow channel or flow channels can be molded, in particular, on the housing. There are preferably at least one inflow channel and one outflow channel. The inflow channel is arranged upstream of the runner and the outflow channel is arranged downstream of the runner.

The runner serves to convey the fluid in the turbomachine. If the conveyed fluid is a gas, in particular air, the runner can also be called a fan impeller. In order to convey the fluid, the runner usually has runner blades which, during operation of the turbomachine, that is to say in the case of rotation of the runner about its rotational axis, act on the fluid in the runner chamber in such a way that this fluid is conveyed. As a result, a positive pressure is produced in the region downstream of the runner, with the result that the fluid is ejected from the turbomachine. In contrast, a negative pressure is produced in the region upstream of the runner chamber, by way of which negative pressure further fluid is sucked in. To this end, the runner is coupled to a rotor of the drive machine. The runner is preferably fastened via a shaft or, even more preferably, directly to the rotor.

The housing is preferably produced in its entirety in one piece. With the exception of the inlets and outlets of the flow channels and any possible opening for inserting the runner and/or the drive motor, the housing preferably does not have any further openings. If there is an opening for inserting the runner and/or the drive motor, it can advantageously be closed by way of a cover plate. The cover plate in its entirety advantageously has a simple, plate-like configuration. An arrangement of the drive motor outside the housing would fundamentally also be conceivable, however. On account of the single-piece configuration of the housing, the turbomachine can advantageously be produced with particularly few components. The turbomachine preferably comprises merely the housing which is produced in one piece, the runner and the drive motor, and at most the cover plate. The turbomachine can optionally also comprise an electronic unit for actuating the drive motor and/or energy stores such as, for example, one or more batteries.

The turbomachine can be configured, in particular, for artificial ventilation or for breathing assistance. In particular, the turbomachine can be configured for use in a CPAP unit. Particularly small dimensioning, possible using the additive manufacturing, of the turbomachine can make it possible that it is arranged and/or supported close to the nose. As a result, the breathing tube becomes short and brings about low resistance, with the result that the power requirement of the turbomachine is reduced.

Thanks to the possible small and light overall design, the turbomachine in accordance with one development of the invention can also be used, in particular, in a full face mask. On account of the additive manufacturing, the housing of the turbomachine can be adapted individually to the respective patient and, as a result, can be a particularly ergonomic design. The technical values of the turbomachine can also be adapted particularly simply on account of the additive manufacturing of the housing.

On account of its particularly simple type of production, the turbomachine can be designed, in particular, as a disposable component. Since the requirements for the service life of the turbomachine are reduced as a result, its production can be considerably simplified and designed to be less expensive. If the turbomachine is used, for example, in a CPAP unit, the latter can be configured to indicate the necessary replacement of the turbomachine to the user, for example, after a certain number of operating hours, in a similar manner as has been known for a relatively long time, for example, in the case of printers in relation to the printer cartridges. The turbomachine itself can be configured, for example, to indicate the necessary replacement to the user and/or the ventilation unit, for example on the basis of a detection of operating hours.

The flow channel or at least one of the flow channels can be, in particular, an outflow channel which extends away from the runner in the tangential and/or radial direction with regard to the rotational axis, and serves to convey the fluid out of the housing. The fluid flow is advantageously not deflected in the transition region between the runner and the outflow channel. Preferably the outflow channel at least in a first portion directly downstream of the runner, and more preferably the entire outflow channel as far as the outlet orifice, extends parallel to a plane which lies perpendicularly with respect to the rotational axis. As a result, the fluid flow is deflected to a smaller extent and correspondingly experiences less resistance.

It can be advantageous in certain embodiments if the outflow channel opens outward from the housing in the tangential and/or radial direction with regard to the rotational axis. At least in a portion directly upstream of the outlet orifice, the outflow channel preferably extends parallel to a plane which lies perpendicularly with respect to the rotational axis. In this way, the fluid flow is deflected to a lesser extent in the region of the outlet orifice, which involves less resistance and fewer fluid turbulences and therefore fewer noise emissions.

It can be advantageous in other embodiments, however, if the outflow channel opens outward from the housing in the axial direction with regard to the rotational axis. In relation to noise emissions, however, the outlet opening is advantageously arranged spaced apart radially from the rotational axis. Here, the outlet opening is preferably formed by an outlet port.

The inflow channel preferably opens outward from the housing in the tangential and/or radial direction with regard to the rotational axis. Preferably at least a first portion of the inflow channel directly downstream of the inlet opening, and more preferably the entire inflow channel as far as the runner, extends parallel to a plane which lies perpendicularly with respect to the rotational axis. As a result, the fluid flow is deflected to a lesser extent and correspondingly experiences less resistance.

Preferably the housing, and more preferably the turbomachine in its entirety, has a cuboid shape. The housing, preferably the turbomachine in its entirety, preferably has a compact and advantageously cassette-like form. The dimensions of the housing in the direction along the rotational axis are preferably at least half as small as in each case in two spatial directions which lie perpendicularly with respect to the rotational axis.

The drive motor is preferably an electric motor with a stator which is stationary with regard to the housing, and with a rotor which rotates during operation. The rotor preferably rotates here about the rotational axis of the runner. The electric motor can be, in particular, a brushless DC motor.

The runner is advantageously produced in its entirety in one piece. It is preferably produced by means of injection molding, advantageously from a plastic material.

In the case of one particularly preferred embodiment, the drive motor is an external rotor motor with a stator and with a rotor which surrounds the stator. Here, the runner is preferably produced by means of injection molding and is attached fixedly to the rotor, advantageously to the radial outer face of the rotor. In this way, the torque can be transmitted in an optimum manner from the rotor to the runner, without a shaft or other additional components being necessary. As a result, the mass moment of inertia of the rotor/runner unit can be minimized, as a result of which particularly high dynamics of the turbomachine can be achieved.

One embodiment is preferred, in particular, in the case of which the runner is molded directly onto the rotor of the external rotor motor. As a result, the runner is connected to the rotor in a particularly firm manner. Moreover, the production is simplified, since the runner is already attached to the motor during its production and accordingly no further steps for coupling the runner to the motor are necessary. The balancing can then take place jointly for the drive motor and the runner. The runner can be molded directly onto the radial outer face of the rotor. In particular, the runner can be molded directly onto the bell-shaped armature of the external rotor motor.

The housing preferably has an interior space for receiving the drive motor and the runner. The drive motor is then advantageously attached to a cover plate which serves to close the interior space to the outside. During the insertion of the drive motor with the runner attached to it into the interior space, the interior space is therefore advantageously at the same time closed by way of the cover plate. The production of the turbomachine is simplified further as a result. When the interior space is closed correctly by way of the cover plate, the housing has no further openings with the exception of one or more inlet orifices and one or more outlet orifices for the fluid.

Moreover, the turbomachine can comprise an electronic unit which serves to control the drive motor, is arranged, in particular, in the interior space of the housing, and is advantageously attached to the cover plate.

The runner preferably comprises backward curved blades. As a result, particularly high pressures and a high degree of efficiency can be achieved.

Moreover, the turbomachine can comprise a particle filter, in particular a HEPA filter, which is arranged in the region of the flow channel or of at least one of the flow channels. The particle filter is particularly preferably arranged in the region of the inlet orifice of the inflow channel, with the result that the runner and the patient to be supplied with breathing are protected against particles.

Moreover, the present invention relates to a turbomachine, in particular a ventilator or compressor, which is preferably configured as indicated above and comprises:

- a runner; and
- a drive motor which is configured as an external rotor motor with a stator and with a rotor which surrounds the stator for driving the runner in a rotational movement about a rotational axis, in order to suck in and to convey a fluid, in particular a gas.

The runner is produced by means of injection molding and is molded directly onto the rotor, in particular onto the radial outer side of the rotor.

The turbomachine can, but does not have to, comprise a housing produced as specified above by means of additive manufacturing with flow channels. The turbomachine with the runner which is molded onto the rotor of the external rotor motor can just as well also comprise a conventionally produced housing.

BRIEF DESCRIPTION OF THE DRAWINGS

Preferred embodiments of the invention will be described in the following text on the basis of the drawings which serve merely for explanatory purposes, are not to be interpreted as restrictive, and in which:

FIG. 20 shows a perspective view of the runner, attached to the drive motor, of the turbomachine from FIG. 16, including the cover plate, FIG. 21 shows a view of the runner, attached to the drive motor, of the turbomachine from FIG. 16, including the cover plate, from the side, FIG. 22 shows a view of the runner, attached to the drive motor, of the turbomachine from FIG. 16, including the cover plate, from the front.

DESCRIPTION OF THE INVENTION

Figure 1:
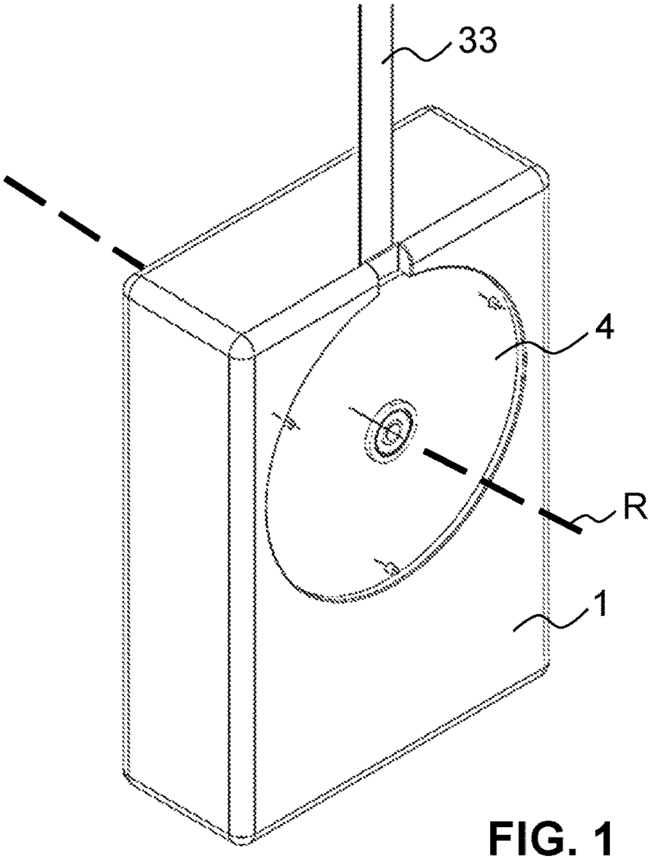
FIG. 1 shows a perspective view obliquely from the rear of a first embodiment of a turbomachine according to the invention.
Figure 2:
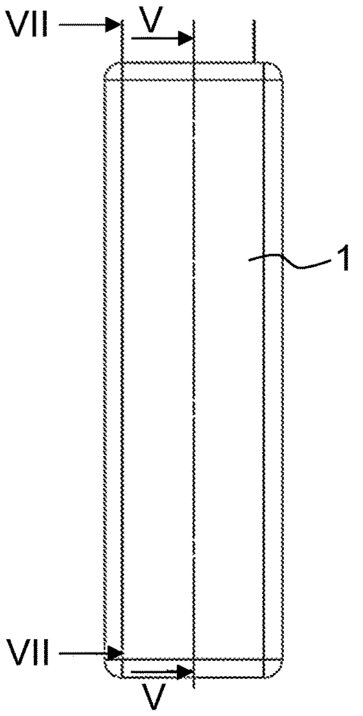
FIG. 2 shows a view of the turbomachine from FIG. 1 from the side.
Figure 3:
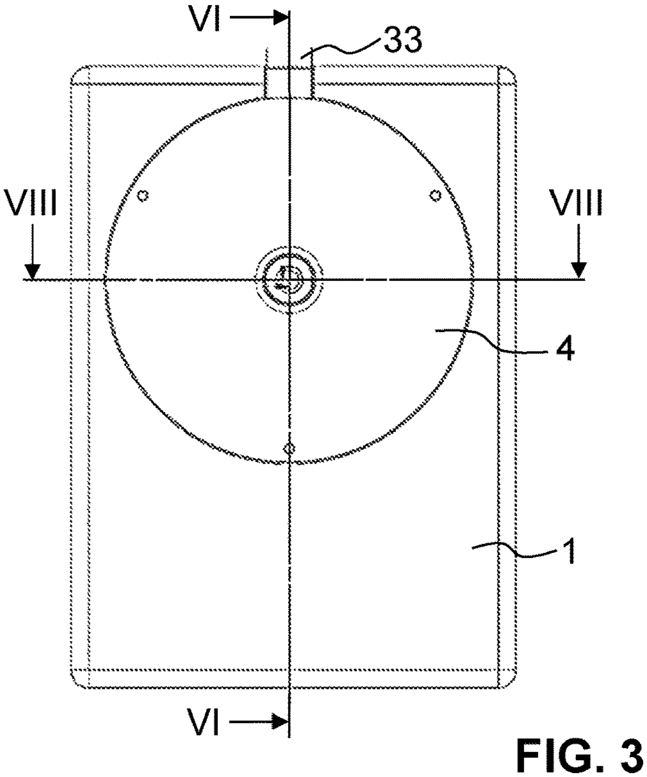
FIG. 3 shows a view of the rear side of the turbomachine from FIG. 1.
Figure 4:
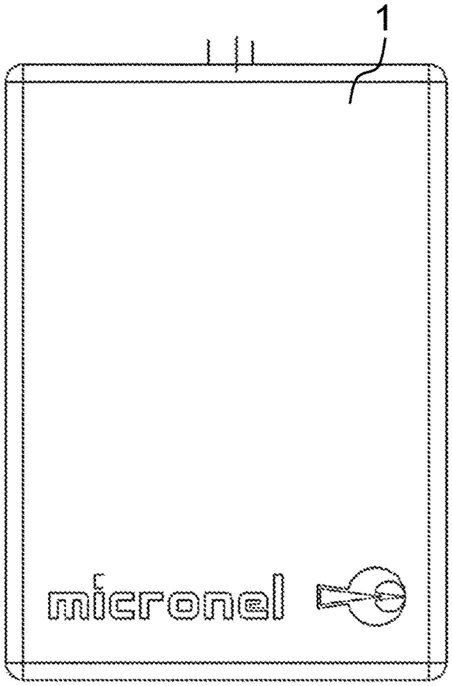
FIG. 4 shows a view of the front side of the turbomachine from FIG. 1.

FIGS. 1 to 29 show different preferred embodiments of turbomachines according to the invention which in each case serve to convey a gas, in particular air, in a ventilation unit. The ventilation unit is preferably a CPAP unit. Elements which fulfill an identical or at least similar function but belong to different embodiments are provided in each case with the same designations.

FIGS. 1 to 4 show different outer views of a first embodiment of a turbomachine according to the invention. As can be seen clearly from these FIGS., the turbomachine overall has a highly compact, cuboid shape. The form of the turbomachine is similar to that of a customary cigarette packet. This cassette-like overall design not only makes simple insertion and removal of the turbomachine in and from the ventilation unit possible, but rather also space-saving storage of a multiplicity of turbomachines of this type. As a result, the turbomachines can be stacked, in particular.

The first embodiment (shown in FIGS. 1 to 8) of a turbomachine has a cuboid housing 1 which is configured in its entirety in one piece. From the outside, merely a circular opening which is closed by way of a cover plate 4 and an inlet orifice 15 and outlet orifice 16 can be seen on the housing 1. The inlet orifice 15 and the outlet orifice 16 are arranged next to one another on a narrow end side of the housing 1. The opening which is closed by the cover plate 4 is situated on the large-area rear side of the housing 1.

The external dimensions of the housing are preferably 50×20×70 mm or 50×20×60 mm.

A control and power supply cable 33 is routed out of the housing 1 on the end side which lies opposite the inlet orifice 15 and the outlet orifice 16. This cable 33 serves to supply a drive motor 3 arranged in the housing interior with electric energy. Moreover, signals can be transmitted via the control and power supply cable 33, in order to actuate and to control the drive motor 3.

The housing 1 is produced by means of additive manufacturing and can accordingly have a surface roughness which is increased in comparison with conventional production processes.

The housing 1 has an interior space 11 which is covered towards the rear side by the cover plate 4. The drive motor 3 with the runner 2 attached to it is arranged in the interior space 11. The drive motor 3 and the runner 2 fill the interior space 11 almost completely. The interior space 11 is delimited by inner faces of the housing 1 which are adapted to the outer shape of the runner 2. In a manner which is adjacent radially with respect to the runner 2, the housing 1 forms a peripheral flow channel 14 which extends around the runner 2.

The drive motor 3 is an external rotor motor with a stator 31 and a rotor 32 which surrounds it. The stator 31 is attached fixedly to the cover plate 4 and, as a result, in a stationary manner in relation to the housing 1. During operation of the turbomachine, the rotor 32 rotates about a rotational axis R which extends perpendicularly with respect to the outer faces of the front and rear side of the housing 1. The drive motor 3 is preferably a brushless DC motor.

The runner 2 which can also be called a fan impeller is attached to the radial outer side of the rotor 32. The runner 2 is advantageously produced in its entirety in one piece and using the injection molding process, for example from a plastic material. Here, the runner 2 is preferably molded directly onto the radial outer side of the rotor 32, more preferably directly onto the bell-shaped armature of the drive motor 3, that is to say the runner 2 is already attached to the rotor 32 during its production.

An outflow channel 13 extends in the radial and, above all, tangential direction toward the outlet orifice 16 from the interior space 11 and from the peripheral flow channel 14. The flow channel 13 extends from the interior space 11 as far as the outlet orifice 16 within the same plane which lies perpendicularly with respect to the rotational axis R. During operation of the turbomachine, the fluid which is conveyed by the runner 2 passes from the interior space 11 through the outflow channel 13 to the outlet orifice 16. A ventilation hose which leads to a patient can be connected to the outlet orifice 16.

Figure 5:
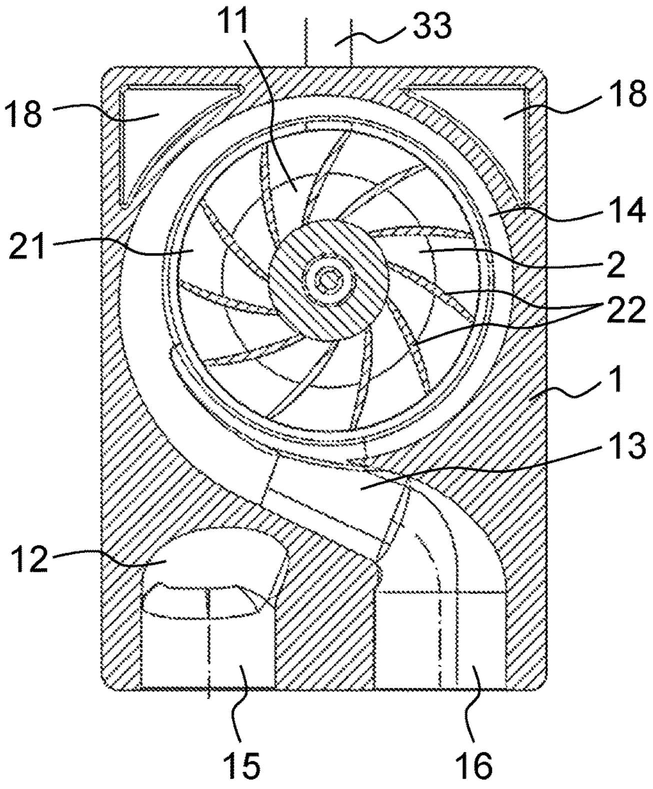
FIG. 5 shows a central sectional view along the plane V-V indicated in FIG. 2 of the turbomachine from FIG. 1.
Figure 6:
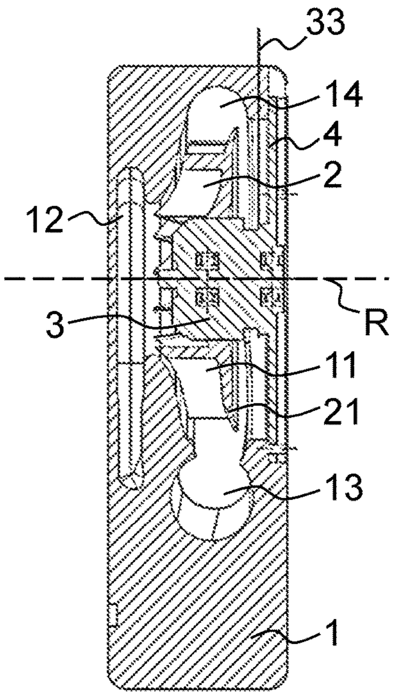
FIG. 6 shows a shows a central sectional view along the plane VI-VI indicated in FIG. 3 of the turbomachine from FIG. 1.
Figure 7:
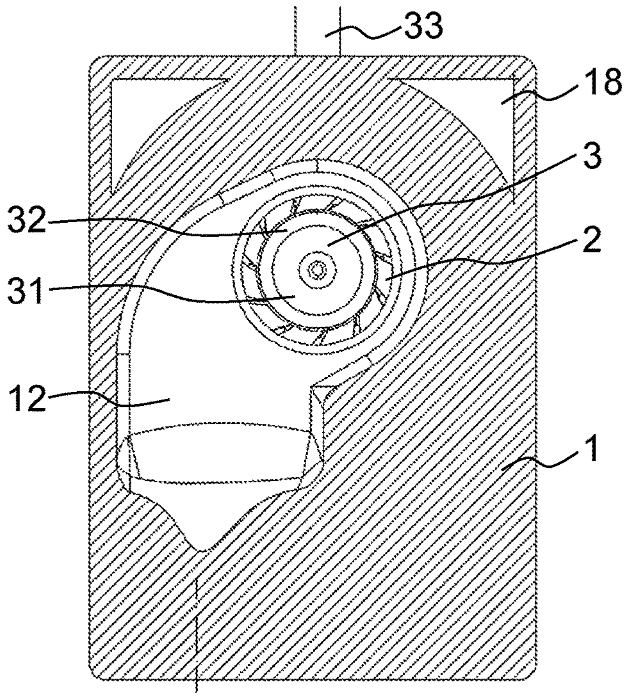
FIG. 7 shows a sectional view along the plane VII-VII indicated in FIG. 2 of the turbomachine from FIG. 1.
Figure 8:
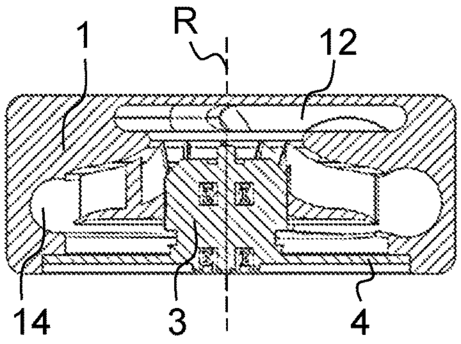
FIG. 8 shows a sectional view along the plane VIII-VIII indicated in FIG. 3 of the turbomachine from FIG. 1.

An inflow channel 12 extends from the inlet orifice 15 toward the runner 2 in such a way that the fluid which is sucked in through the inflow channel 12 impinges on the runner 2 centrally from the front side and in the axial direction with regard to the rotational axis R. To this end, the inflow channel 12 extends from the inlet orifice 15 first of all slightly toward the front side of the housing 1 and subsequently upstream of the outflow channel 13 and the interior space 11 toward the rotational axis R (see FIGS. 5-7). As viewed in the direction from the front to the rear side of the housing 1 (FIGS. 6 and 8), the inflow channel 12 tapers continuously as far as the rotational axis R. It widens, however, in the directions which lie perpendicularly with respect thereto (FIGS. 5 and 7). In the region of the rotational axis R, the inflow channel 12 opens in the axial direction into the interior space 11.

During operation of the turbomachine, the fluid which can be a gas such as, for example, air is sucked in by the rotating fan impeller 2 through the inlet opening 15 into the inflow channel 12. The fluid then passes through the inflow channel 12 to the front side of the runner 2. In the region of the rotational axis R, the fluid which flows in through the inflow channel 12 is deflected by approximately 90°, with the result that is impinges centrally on the front side of the runner 2 and is captured by the latter. The axially in-flowing fluid is again deflected by approximately 90° and conveyed to the outside in the radial direction by the runner 2. From there, it passes into the peripheral flow channel 14 and, via the latter, into the outflow channel 13. The fluid is ejected from the housing 1 through the outflow channel 13 and the outlet orifice 16.

Both the inflow channel 12 and the outflow channel 13 therefore extend in each case completely in the interior of the housing 1, and form a comparatively complex three-dimensional structure together with the interior space 11. By means of conventional production processes and, in particular, by means of production processes which are based on casting molds, a complex structure of this type of the housing 1 could not readily be realized in one piece. Additive manufacturing makes this possible, however, and makes an even more compact, optimum overall design of the housing 1 possible as a result.

The parallel arrangement of the inlet orifice 15 and the outlet orifice 16 make a particularly space-saving arrangement of connector lines possible. Since the fluid flow is deflected both in the inflow channel 12 and in the outflow channel 13, the runner 2 is visible neither through the inlet orifice 15 nor through the outlet orifice 16. The noise generated by the runner 2 cannot pass to the outside on a direct path as a result, but rather is reflected multiple times in the interior of the housing 1 and in the process is absorbed at least in part, which results in a clearly perceivable noise reduction toward the outside.

It can be seen in FIGS. 5 and 7 that the housing 1 of the present embodiment has cavities 18. The cavities 18 are in each case enclosed completely by the material of the housing 1, which is simply possible on account of the additive manufacturing during production. The cavities 18 permit material savings and, as a result, make a less expensive and lighter housing 1 possible. Moreover, cavities can also serve, however, to reduce noise emissions of the turbomachine. To this end, the cavities are advantageously filled partially or completely with a powder which has a vibration-absorbing and noise-absorbing effect. This is preferably the additive powder which is used in any case during the additive production process for the housing 1. Instead of the additive powder being ejected from the cavities 18 during the production in the regions of these cavities 18, it therefore preferably remains in them. In this way, a particularly low-vibration and quiet turbomachine can be achieved with low production effort.

Figure 9:
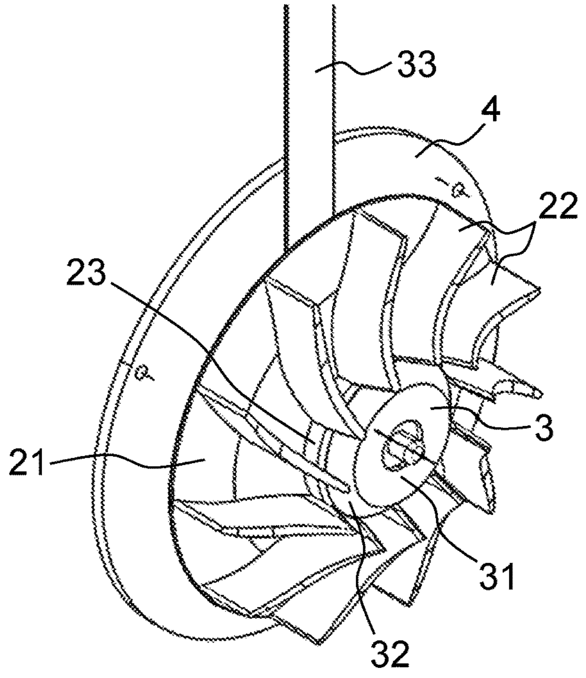
FIG. 9 shows a perspective view of the runner, attached to the drive motor, of the turbomachine from FIG. 1, including the cover plate.
Figure 10:
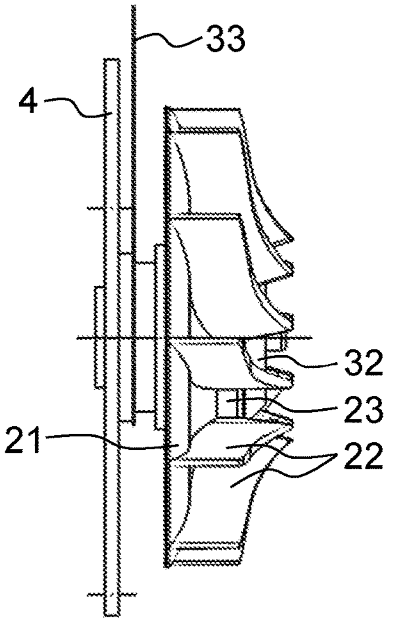
FIG. 10 shows a view of the runner, attached to the drive motor, of the turbomachine from FIG. 1, including the cover plate, from the side.
Figure 11:
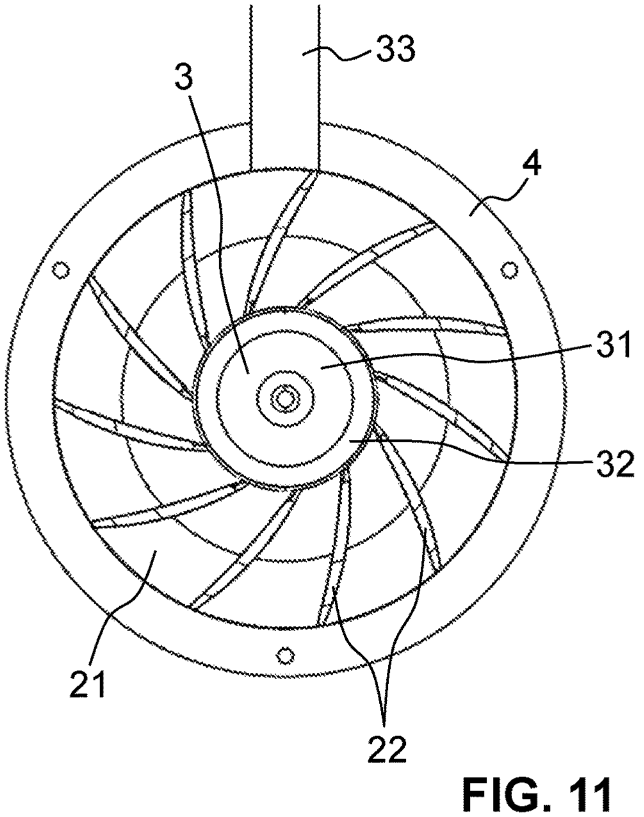
FIG. 11 shows a view of the runner, attached to the drive motor, of the turbomachine from FIG. 1, including the cover plate, from the front.

The runner 2 can be seen clearly, in particular, in FIGS. 9 to 11. It has a circular base plate 21 which has a central opening, in which the drive motor 3 is arranged. The base plate 21 is curved slightly forward toward the center or toward the opening. In the region of the opening, the base plate 22 can have a second portion or, as can be seen in FIGS. 9 and 10, can merge into a retaining ring 23 which establishes the connection to the rotor 32 of the drive motor 3. Blades 22 which extend in each case from the retaining ring 23 as far as the outer edge of the base plate 21 are attached at regular spacings to the front side of the base plate 21. The blades 22 in each case have an approximately constant height along the extent from the inner edge to the outer edge of the base plate 21. On account of the curvature of the base plate 21, the blades 22 in each case rise slightly forward toward the center.

The blades 22 are curved backward; that is to say, they are curved backward in each case with regard to the rotational direction when the runner 2 rotates, from the center of the base plate 21 to the outside. In the view of FIG. 11, the runner 2 therefore correctly rotates in the counterclockwise direction. As a result of the backward curved blades 22, the runner is configured to generate a particularly high pressure during operation.

A differential pressure between the inlet orifice 15 and the outlet orifice 16 of up to 17 mbar in the case of a degree of efficiency of 40% was able to be achieved by way of a turbomachine which was realized in accordance with the present exemplary embodiment.

A second embodiment of a turbomachine according to the invention is shown in FIGS. 12 to 15. The embodiment of FIGS. 12 to 15 differs from that according to FIGS. 1 to 11 in that the outlet orifice 16 is not arranged parallel to the inlet orifice 15 here, but rather is directed in the axial direction. The outlet orifice 16 is bordered by an outlet port 17 which extends away from the rear side of the housing 1 parallel to the rotational axis R, but spaced apart from the latter. In the case of this embodiment, the inlet orifice 15 and the outlet orifice 16 therefore have directions which lie perpendicularly on one another. The provision of the connector port 17 facilitates the coupling of, for example, a ventilation hose to the outlet orifice 16.

Furthermore, the present embodiment differs from that of FIGS. 1 to 11 in that a HEPA filter 6 is provided in the region of the inlet orifice. The HEPA filter 6 is a particle filter which prevents the penetration of particles such as dust, etc. into the interior of the housing 1.

Figure 15:
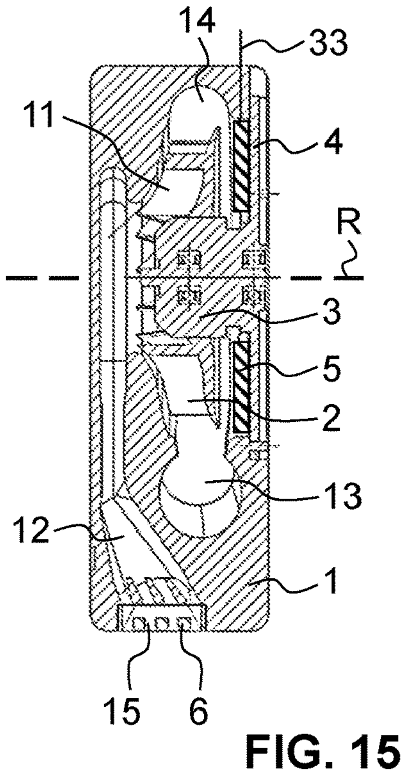
FIG. 15 shows a central sectional view along the plane XV-XV indicated in FIG. 14 of the turbomachine from FIG. 12.
Figure 16:
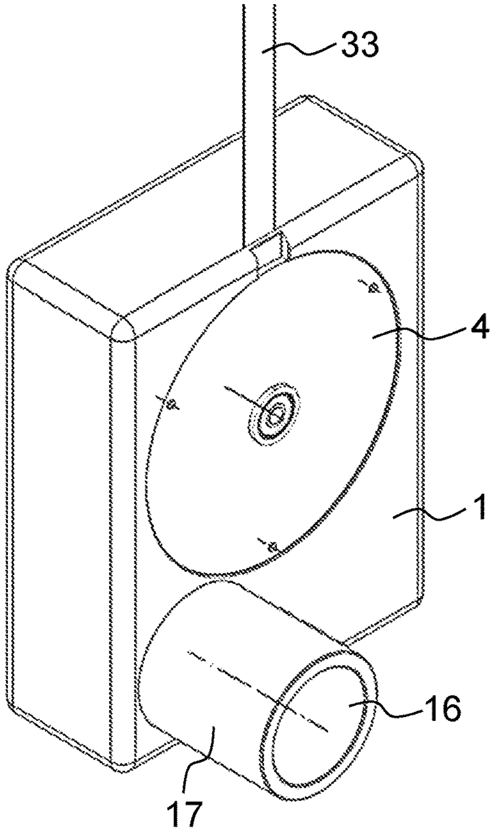
FIG. 16 shows a perspective view obliquely from the rear of a third embodiment of a turbomachine according to the invention.
Figure 17:
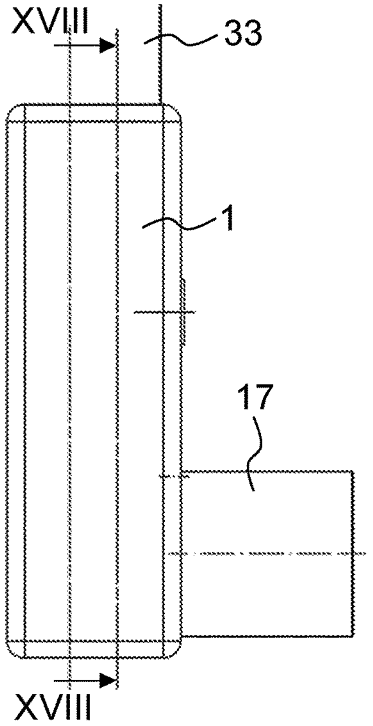
FIG. 17 shows a view of the turbomachine from FIG. 16 from the side.
Figure 18:
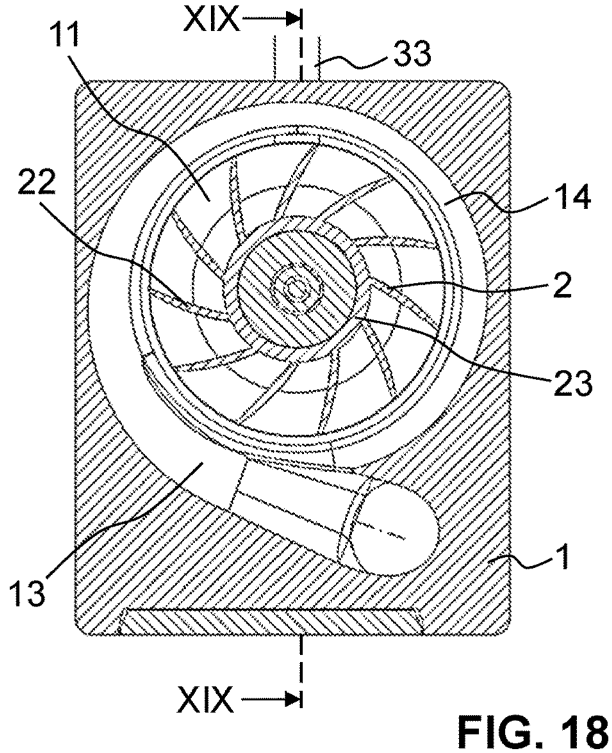
FIG. 18 shows a central sectional view along the plane XVIII-XVIII indicated in FIG. 17 of the turbomachine from FIG. 16.
Figure 19:
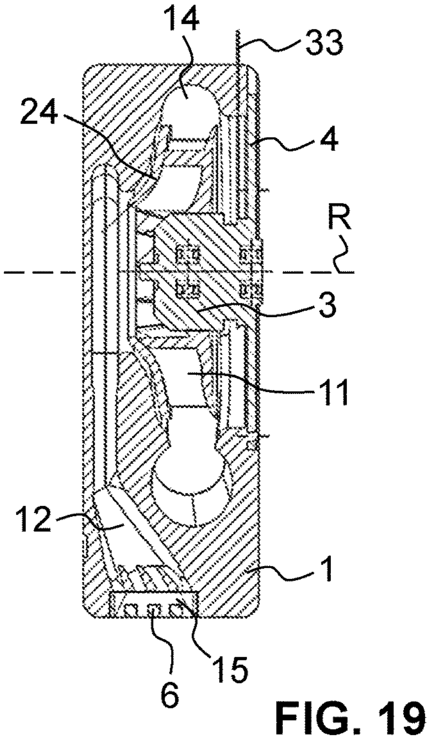
FIG. 19 shows a central sectional view along the plane XIX-XIX indicated in FIG. 18 of the turbomachine from FIG. 16.

Moreover, it can be seen in FIG. 15 that an electronic unit 5 is additionally arranged in the interior space 11. The electronic unit 5 which is attached to the cover plate 4 serves to actuate and to control the drive motor 3. The electronic unit 5 can also comprise sensors, for example for measuring the rotational speed, the temperature and/or vibrations. The electronic unit 5 might also comprise an RFID or a wireless connecting unit such as, for example, a Bluetooth unit, in order, for example, to make a detection by way of the ventilation unit possible, in order that, for example, only a certain type of turbomachines can be connected. An energy store such as, for example, one or more batteries might optionally also be arranged in the interior space 11 and attached to the cover plate 4, in order to supply the drive motor 3 with electric energy.

Figure 12:
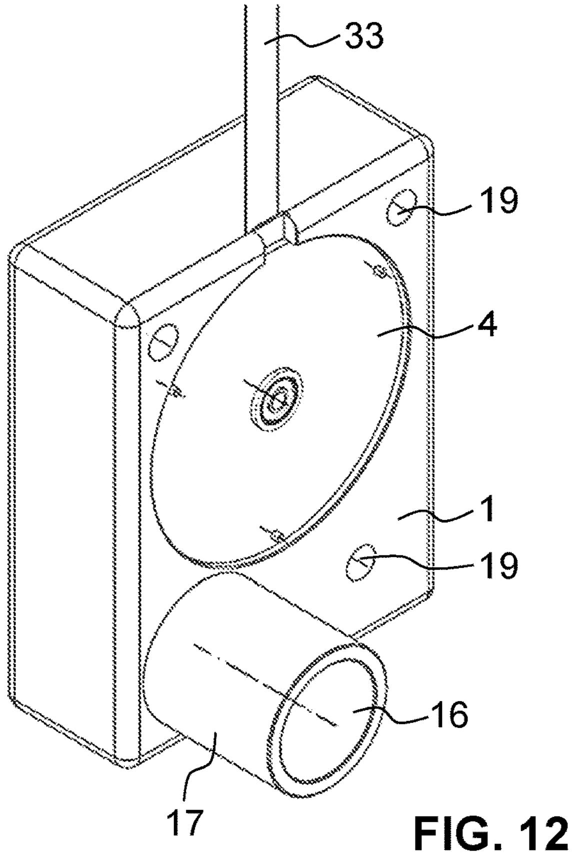
FIG. 12 shows a perspective view obliquely from the rear of a second embodiment of the turbomachine according to the invention.
Figure 13:
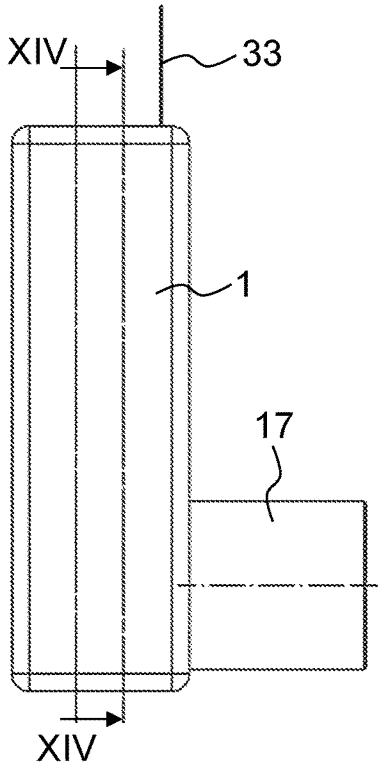
FIG. 13 shows a view of the turbomachine from FIG. 12 from the side.
Figure 14:
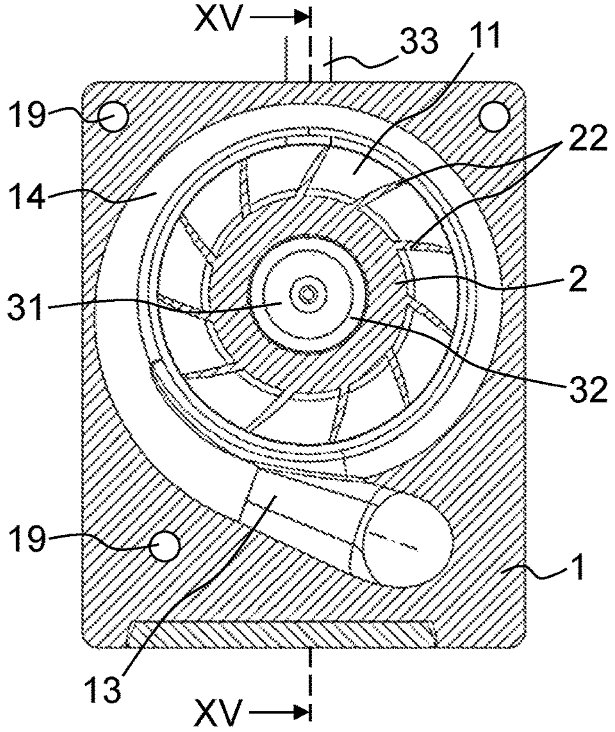
FIG. 14 shows a central sectional view along the plane XIV-XIV indicated in FIG. 13 of the turbomachine from FIG. 12.

As can be seen in FIGS. 12 and 14, the housing 1 here has a plurality of bores 19 which serve to fasten the turbomachine, for example, in a ventilation unit. In order to damp vibrations and noise emissions, nails or screws which are produced from an elastic rubber material are preferably guided through the bores 19 for fastening purposes. In particular, elastic nails are known for use in the field of ventilators.

FIGS. 16 to 22 show a further embodiment which corresponds substantially to that of FIGS. 12 to 15, but comprises a runner 2 with a cover disk 24. The cover disk 24 which is attached to the blades 22 on the front side of the runner 2 can be seen in FIGS. 19 to 22. On account of the cover disk 24, the flow channels between the blades 22 are delimited in each case not only to the rear and to the side, but rather also to the front, as a result of which fewer turbulences occur in the region of the runner during operation.

Figure 23:
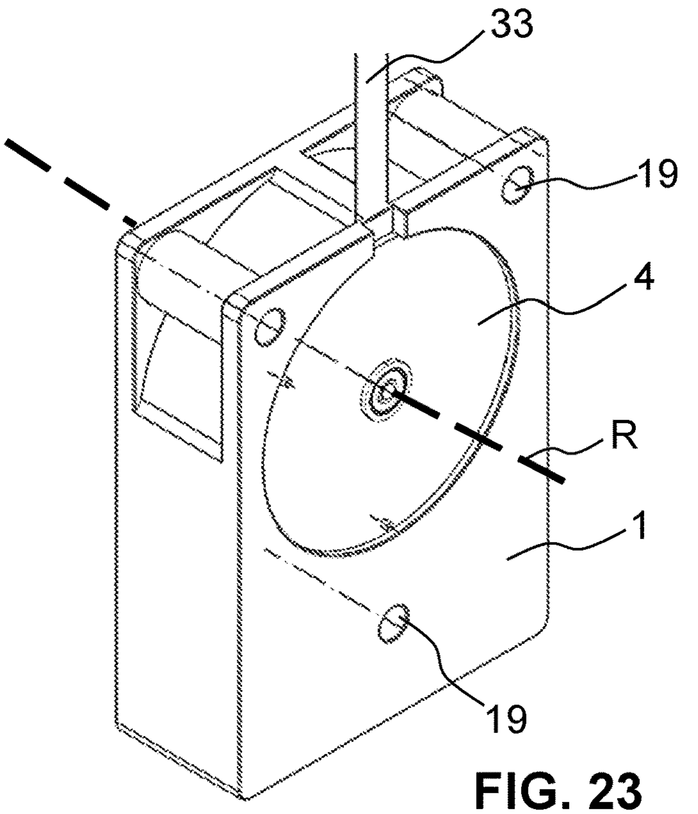
FIG. 23 shows a perspective view obliquely from the rear of a fourth embodiment of the turbomachine according to the invention.
Figure 24:
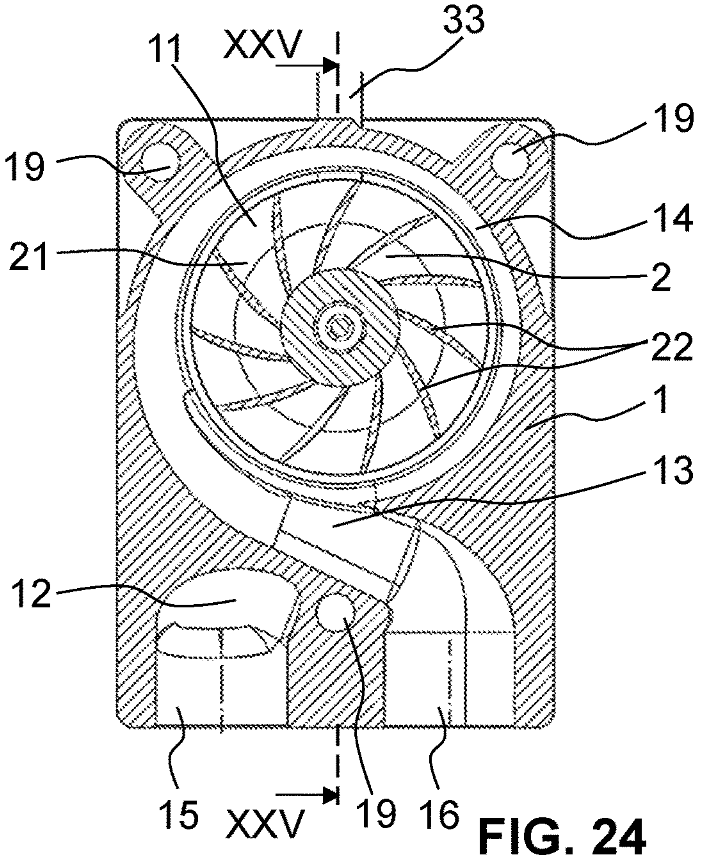
FIG. 24 shows a central sectional view of the turbomachine from FIG. 23.
Figure 25:
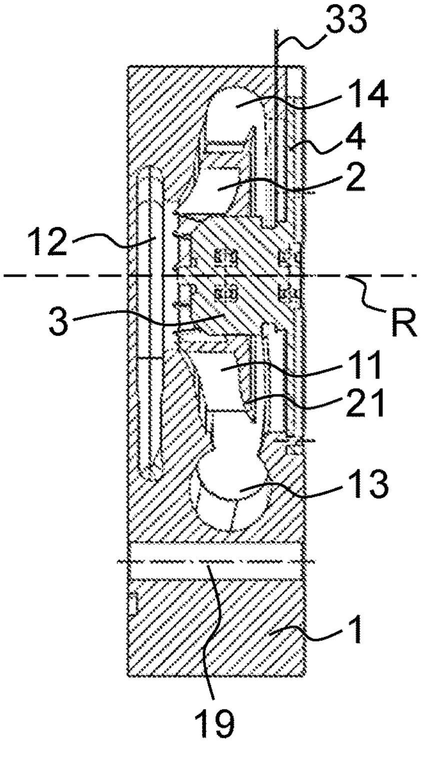
FIG. 25 shows a central sectional view along the plane XXV-XXV indicated in FIG. 24 of the turbomachine from FIG. 23.
Figure 26:
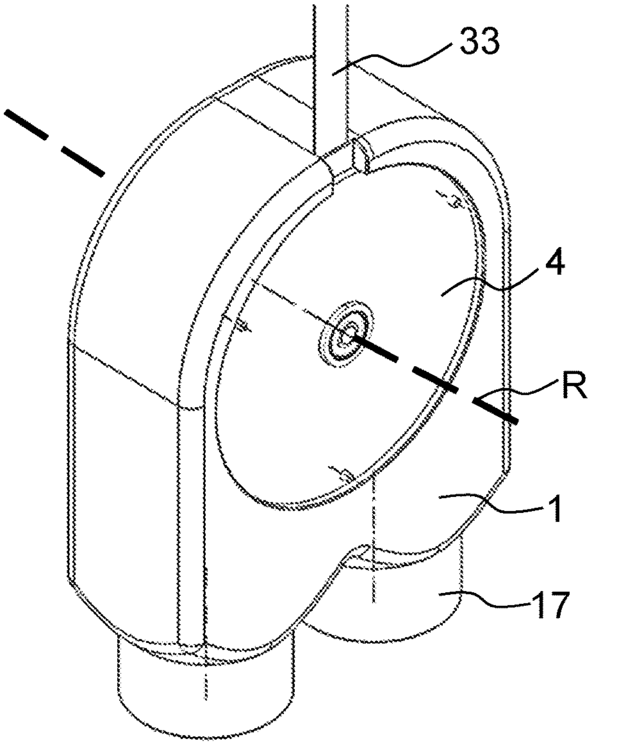
FIG. 26 shows a perspective view obliquely from the rear of a fifth embodiment of the turbomachine according to the invention.
Figure 27:
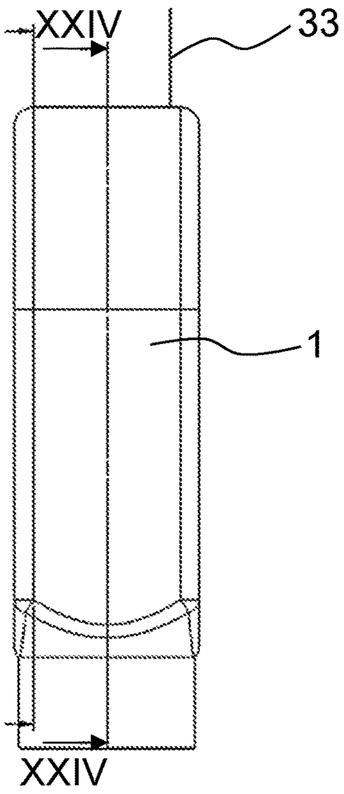
FIG. 27 shows a view of the turbomachine from FIG. 26 from the side.
Figure 28:
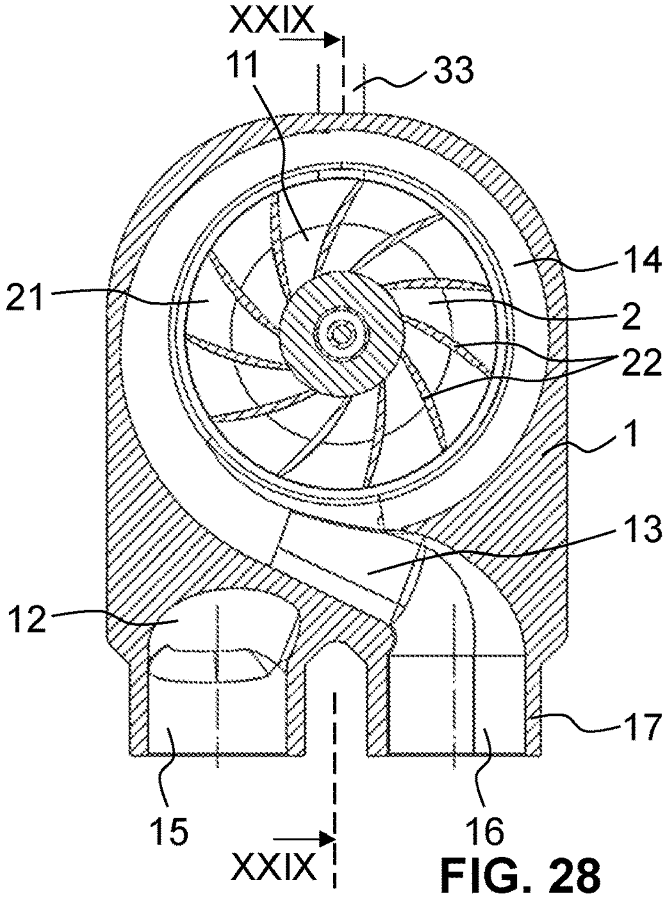
FIG. 28 shows a central sectional view along the plane XXIV-XXIV indicated in FIG. 27 of the turbomachine from FIG. 26.
Figure 29:
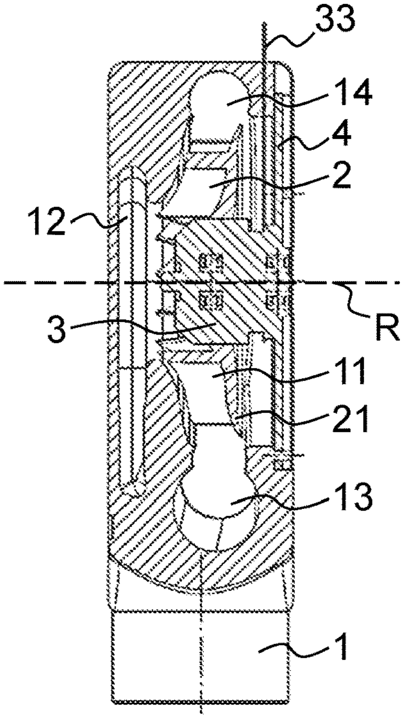
FIG. 29 shows a central sectional view along the plane XXIX-XXIX indicated in FIG. 28 of the turbomachine from FIG. 26.

A further fourth embodiment of the turbomachine according to the invention is shown in FIGS. 23 to 25. This embodiment correspond substantially to that of FIGS. 1 to 11, wherein no cavities 18 are provided here, however, but rather bores 19. The bores 19 serve to fasten the turbomachine, for example, to a ventilation unit. To this end, the fastening means such as, for example, nails or screws which can be produced, in particular, from an elastic rubber material can be guided through the bores 19. Instead of the cavities 18, material reductions in the form of cutouts are provided in each case around the bores 19 in the upper corner regions in the case of the embodiment of FIGS. 23 to 25, in contrast to that of FIGS. 1 to 11. In this way, the material consumption during the production can be reduced and the housing 1 can be produced so as to be lighter.

FIGS. 26 to 29 show a fifth embodiment of a turbomachine according to the invention which will be described in the following text on the basis of the differences from the embodiment of FIGS. 1 to 11. Here, the housing 1 is produced with less material and is therefore lighter than the housing of the embodiment of FIGS. 1 to 11. This is achieved by the upper corner regions along the interior space 11 being of rounded configuration. Moreover, the inlet orifice 15 and the outlet orifice 16 are in each case configured within a port, as a result of which the material consumption around in each case the two ports is reduced. In addition to the lower material consumption, the ports also entail the advantage, however, that the coupling of hoses is facilitated. Thus, for example, a fresh air feed hose can be coupled to the inlet port, and a ventilation hose can be coupled to the outlet port 17. The shape of the housing 1 can be adapted particularly simply on account of the additive manufacturing.

It goes without saying that the invention described herein is not restricted to the abovementioned embodiments, and a multiplicity of modifications are possible. It would thus be conceivable, for example, for the drive motor to be arranged outside the turbomachine or outside the housing. The flow channels which extend in the interior of the housing might also run differently and/or the number might be greater. It would thus be possible, for example, that there were a plurality of inflow channels and/or a plurality of outflow channels, in order to suck in the fluid and to convey it out of the housing, respectively. The runner can have any desired other configuration than that which is proposed in the preceding embodiments. The blades might thus also be forward curved or not curved at all, for example. The turbomachines which are shown in the exemplary embodiments are in each case radial turbomachines. Instead, the turbomachine might also be an axial turbomachine, however, in the case of which the fluid flows along the rotational axis into the housing and to the runner and leaves the housing again along the rotational axis. In this case, the housing and the runner would in each case have completely different configurations than those described in relation to the preceding exemplary embodiments. Furthermore, it would be conceivable, for example, to provide connector pins on the outer side of the housing instead of the control and power supply cable 33, in order to make the transmission of electric energy and/or signals possible. A multiplicity of further modifications are conceivable.

The invention claimed is:

1. A turbomachine, comprising a monolithic housing with an interior space and with walls which define a plurality of flow channels, wherein at least one of the plurality of flow channels is an inflow channel and at least one of the plurality of channels is an outflow channel;

an impeller which is arranged in a chamber formed by the interior space of the housing; and a drive motor arranged in the interior space for driving the impeller in a rotational movement about a rotational axis, in order to convey a fluid out of the housing through the at least one outflow channel;

wherein the chamber has inner surfaces which are adapted to an outer shape of the impeller, and wherein 50% or more of the inner surfaces are formed by the housing, wherein the at least one outflow channel extends away from the impeller in a tangential and/or radial direction with regard to the rotational axis, wherein the at least one inflow channel has a portion that extends perpendicular to the rotational axis, and wherein the housing is produced by additive manufacturing.

2. The turbomachine as claimed in claim 1, wherein the impeller is configured to deflect a fluid flow from an axial direction into the radial direction with regard to the rotational axis.

3. The turbomachine as claimed in claim 1, wherein the at least one outflow channel opens outward from the housing in the tangential and/or radial direction with regard to the rotational axis.

4. The turbomachine as claimed in claim 1, wherein the at least one inflow channel extends toward the impeller in such a way that the fluid is sucked in through the at least one inflow channel causing the fluid to impinge on a central portion of the impeller in an axial direction with regard to the rotational axis.

5. The turbomachine as claimed in claim 4, wherein the inflow channel opens outward from the housing in the tangential and/or radial direction with regard to the rotational axis.

6. The turbomachine as claimed in claim 5, wherein the at least one outflow channel and the at least one inflow channel open outward from the housing in such a way, that the at least one outflow channel and the at least one inflow channel are arranged parallel to each other and at a same height with regard to the rotational axis.

7. The turbomachine as claimed in claim 1, wherein the housing has a cuboid shape.

8. The turbomachine as claimed in claim 1, wherein the drive motor is an external rotor motor with a stator and with a rotor which surrounds the stator, and wherein the impeller is produced by means of injection molding and is molded directly onto the rotor.

9. The turbomachine as claimed in claim 1, wherein the drive motor is attached to a cover plate which is configured to close the interior space toward an outside.

10. The turbomachine as claimed in claim 9, further comprising, an electronic unit configured to control the drive motor and arranged in the interior space of the housing and attached to the cover plate.

11. The turbomachine as claimed in claim 1, wherein the impeller comprises backward curved blades.

12. The turbomachine as claimed in claim 1, further comprising a particle filter arranged in a region of the at least one flow channel.

13. The turbomachine as claimed in claim 12, wherein the particle filter is a HEPA filter.

14. The turbomachine as claimed in claim 1, wherein the turbomachine in its entirety has a cuboid shape.

15. A turbomachine, comprising a monolithic housing with an interior space and with walls which define at least one flow channel;

an impeller which is arranged in a chamber formed by the interior space of the housing; and a drive motor arranged in the interior space for driving the impeller in a rotational movement about a rotational axis, in order to convey a fluid out of the housing through the at least one flow channel;

wherein the at least one flow channel is comprised of an outflow channel which extends away from the impeller in a tangential and/or radial direction with regard to the rotational axis and is configured to convey the fluid out of the housing, and wherein the housing is produced by additive manufacturing and comprises an opening for inserting the impeller.

* * * * *